US 9,588,495 B2

(12) United States Patent
Plankert et al.

(10) Patent No.: US 9,588,495 B2
(45) Date of Patent: Mar. 7, 2017

(54) METHOD FOR MANUFACTURING A SELECTIVELY CONDUCTIVE CERAMIC COATED WITH METALLIC MATERIAL

(71) Applicant: The Swatch Group Research and Development Ltd., Marin (CH)

(72) Inventors: Guido Plankert, Boppelsen (CH); Pierry Vuille, Coffrane (CH)

(73) Assignee: The Swatch Group Research and Development Ltd, Marin (CH)

( * ) Notice: Subject to any disclaimer, the term of this patent is extended or adjusted under 35 U.S.C. 154(b) by 531 days.

(21) Appl. No.: 14/057,159

(22) Filed: Oct. 18, 2013

(65) Prior Publication Data
US 2014/0112112 A1 Apr. 24, 2014

(30) Foreign Application Priority Data
Oct. 24, 2012 (EP) .................................... 12189692

(51) Int. Cl.
G04B 37/22 (2006.01)
G04B 19/18 (2006.01)
C04B 41/90 (2006.01)
C04B 41/00 (2006.01)
C04B 41/52 (2006.01)

(52) U.S. Cl.
CPC ............ *G04B 37/22* (2013.01); *C04B 41/009* (2013.01); *C04B 41/52* (2013.01); *C04B 41/90* (2013.01); *G04B 19/18* (2013.01); *G04B 37/226* (2013.01); *Y10T 29/49579* (2015.01)

(58) Field of Classification Search
CPC ...... G04B 37/22; G04B 19/18; G04B 37/226; C04B 41/90; C04B 41/009; C04B 41/52; Y10T 29/49579
See application file for complete search history.

(56) References Cited

U.S. PATENT DOCUMENTS

| 3,228,861 A | 1/1966 | Vogt et al. |
| 5,928,977 A | 7/1999 | Magnin et al. |
| 2011/0103199 A1* | 5/2011 | Winkler .................. B21J 1/006 368/285 |
| 2011/0259753 A1 | 10/2011 | Grossenbacher et al. |

FOREIGN PATENT DOCUMENTS

| CH | 649 670 A3 | 6/1985 |
| EP | 1 160 224 A1 | 12/2001 |
| EP | 2 380 864 A1 | 10/2011 |

OTHER PUBLICATIONS

English Machine Translation of EP1160224A1, Christian Verdon, Process for producing a zirconia base article having a metallic golden aspect, Dec. 5, 2001.*
European Search Report issued on Apr. 25, 2013 in EP 12189692 filed on Oct. 24, 2012 ( with English Translation).

* cited by examiner

Primary Examiner — Sarang Afzali
(74) Attorney, Agent, or Firm — Oblon, McClelland, Maier & Neustadt, L.L.P.

(57) ABSTRACT

A method of manufacturing a ceramic element for a timepiece is provided, including forming a body made of oxide-based ceramic; exposing at least one portion of the external surface of the body to a reduction reaction, to remove oxygen atoms to a predetermined depth in order to make the at least one portion electrically conductive; depositing a metallic material starting from the at least one electrically conductive portion; and machining the body and/or the metallic material in order to provide the element with an aesthetic finish.

19 Claims, 5 Drawing Sheets

METHOD FOR MANUFACTURING A SELECTIVELY CONDUCTIVE CERAMIC COATED WITH METALLIC MATERIAL

This application claims priority from European patent application No. EP 12189692.2 filed Oct. 24, 2012, the entire disclosure of which is incorporated herein by reference.

FIELD OF THE INVENTION

The invention relates to a selectively conductive ceramic and, in particular, a ceramic of this type comprising a coating of metallic material.

BACKGROUND OF THE INVENTION

It is known to deposit an adhesion layer on ceramic parts to adhere to the ceramic and a wetting layer for a subsequent galvanic deposition to adhere to.

These two layers may, however, be subject to delamination not only during deposition but also during electroplating or when the final part is used.

SUMMARY OF THE INVENTION

It is an object of the present invention to overcome all or part of the aforecited drawbacks by proposing an oxide-based ceramic which is selectively made conductive without resorting to the deposition of an adhesion layer and possibly without a wetting layer.

The invention therefore relates to a method of manufacturing an element for a timepiece including the following steps:
  a) forming an oxide-based ceramic body;
  b) exposing at least one portion of the external surface of the body to a reduction reaction, to remove oxygen atoms to a predetermined depth in order to make said at least one portion electrically conductive;
  c) depositing a metallic material starting from said at least one electrically conductive portion;
  d) machining the body and/or the metallic material in order to provide the element with an aesthetic finish.

Advantageously according to the invention, the conductive surface is no longer obtained by depositing a layer on top of the body but by the intrinsic destructuration of the material forming the body to a predetermined depth, i.e. with no possibility of delamination.

Moreover, the oxygen atoms removal may be selective, i.e. the directivity of the reduction reaction enables it to be limited to all or part of the external surface.

In accordance with other advantageous features of the invention:
  step a) is achieved by sintering;
  step b) is achieved by plasma etching;
  the plasma used in step b) includes an ionised mixture of hydrogen and neutral gas;
  the predetermined depth of oxygen atoms removal (reduction reaction) is comprised between 25 nm and 10 µm;
  during step b), the entire external surface of the body is exposed to a reduction reaction;
  according to a second embodiment, between step a) and step b), the method includes step e) of etching at least one recess into one surface of the body, each at least one recess forming the pattern cavity of a decoration so that step c) completely fills said at least one recess;
  step e) is performed by laser;
  step e) is performed to a depth of between 80 µm and 200 µm so as to improve the force of adherence;
  each at least one recess has a continuous, at least partially curved surface (without edge) so as to facilitate implementation of step c);
  according to a third embodiment, after step e), the method includes step f) of etching at least one hole communicating with said at least one recess to form an anchorage device so that step c) completely fills said at least one recess and at least partially fills said at least one hole;
  said at least one hole passes through said element so that it may be at least partially filled by the metallic material in step c), in order to increase the contact surface with said element;
  the diameter of said at least one hole flares gradually as it gets further away from said at least one recess so as to hold said galvanic deposition against said element;
  step f) is achieved by laser by orienting the beam from the surface opposite that intended to receive said at least one recess;
  according to a variant of the embodiments, before step c), the method includes step g) of forming a member and step h) of assembling the member to the body so that step c) secures the assembly of the member to the body by locking the member against said body via said metallic material;
  the member is formed from the same type of material as the body or from a metallic material;
  step c) is achieved by electroplating, sintering or casting;
  the body is formed from a metal oxide.

The invention also relates to a ceramic element for a timepiece, characterized in that it includes an oxide-based body and at least one portion of the external surface thereof is low in oxygen atoms and is coated with metallic material in order to form a functional part.

In accordance with other advantageous features of the invention:
  the body of said element forms all or part of a case and/or a bracelet and/or a bezel and/or a dial and/or a crystal and/or a push button and/or a crown and/or a bridge and/or a plate and/or an oscillating weight;
  the functional part forms a decoration and/or a contact surface.

BRIEF DESCRIPTION OF THE DRAWINGS

Other features and advantages will appear clearly from the following description, given by way of non-limiting illustration, with reference to the annexed drawings, in which.

DETAILED DESCRIPTION OF PREFERRED EMBODIMENTS

Figure 1:
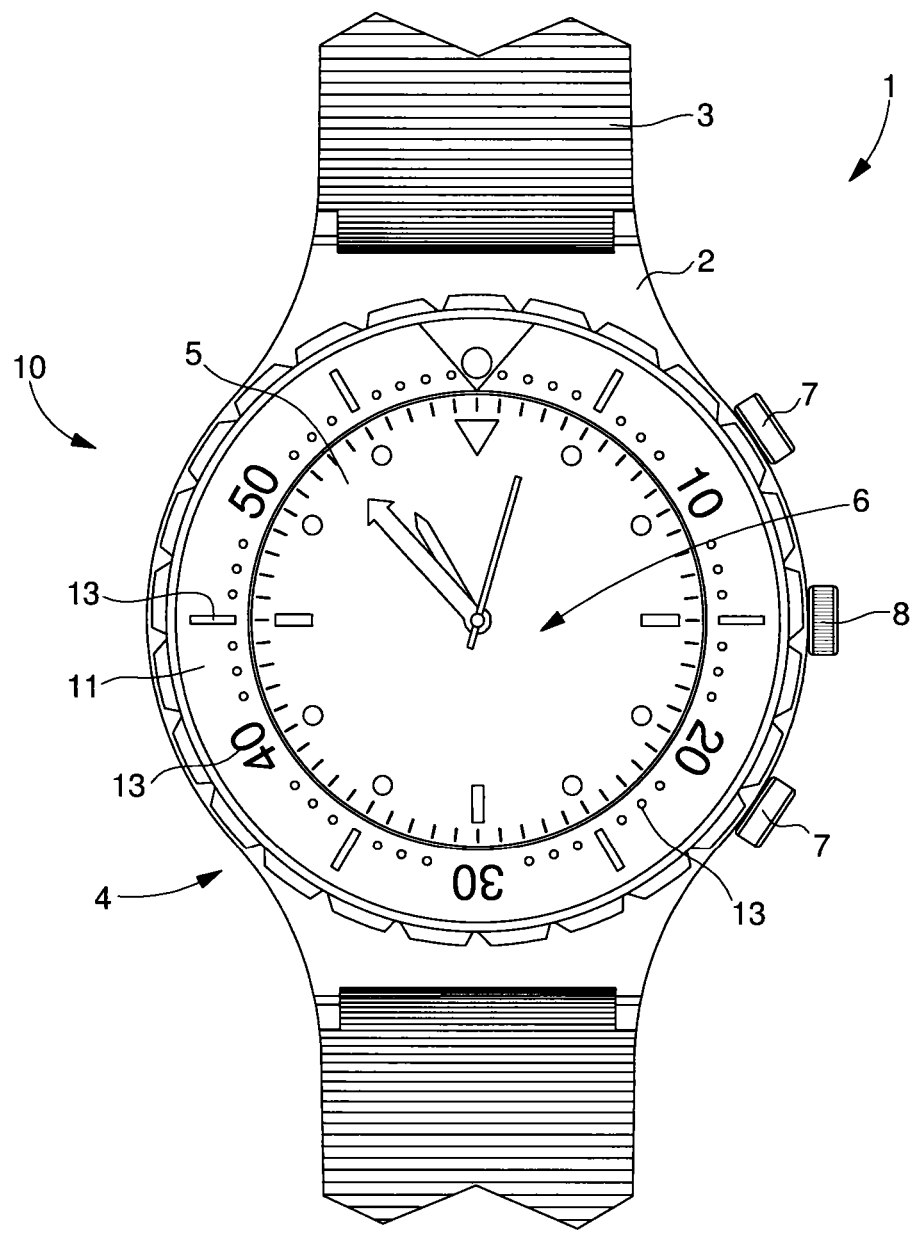
FIG. 1 is a diagram of a timepiece according to the invention.

The example illustrated in FIG. 1 shows a timepiece, generally referenced 1, including at least one element 10.

Each element 10 is intended to form a part that is very resistant to wear, including at least one, at least partially metallic decoration 13, whose visual quality is improved, particularly in terms of contrast.

Element 10 according to the invention may form either all or part of the external part of timepiece 1. Thus, it could form all or part of a case 2, bracelet 3, bezel 4, dial 5, crystal 6, push button 7 and/or a crown 8. In the example illustrated below, the explanation of the invention will be given with reference to a ring including decorations 13, which may or not be inlaid, forming the graduations of a bezel 4. It is also possible to form elements 10, which may or may not be inlaid, for a timepiece movement such as, for example, a bridge and/or a plate and/or an oscillating weight.

As illustrated in FIGS. 1 to 10, ceramic element 10, 10', 10" includes an oxide-based body 11, 11', 11" and at least one portion 15, 15', 15" of the external surface F thereof is low in oxygen atoms and is coated with a metallic material 16, 16', 16" to form a functional part such as a decoration and/or a contact surface.

Figure 7:
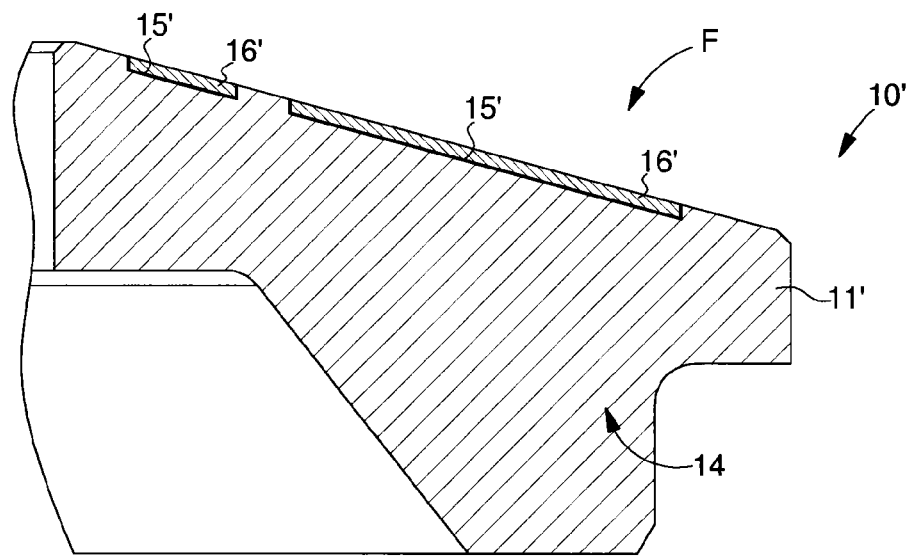
Figure 10:
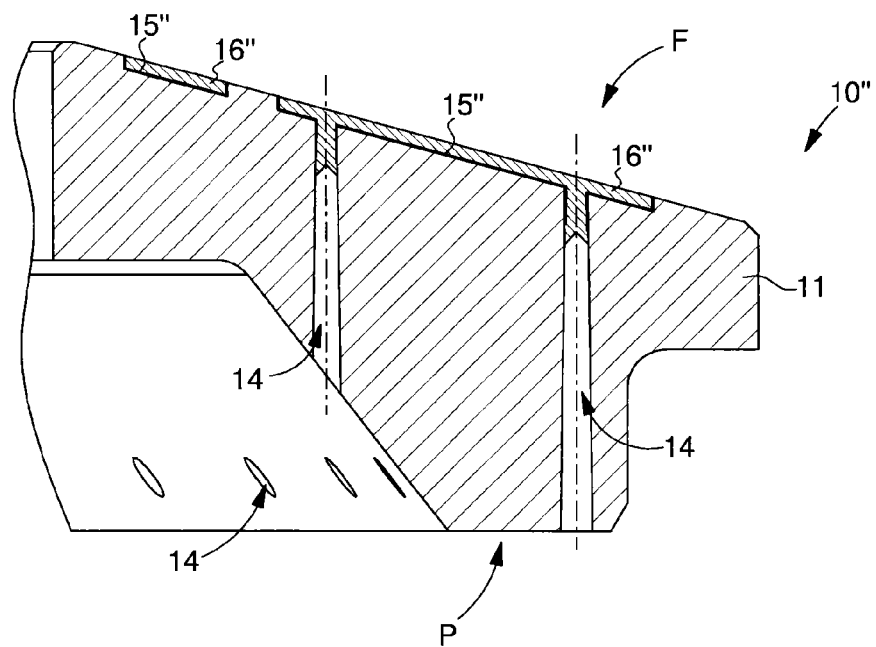

FIGS. 7 and 10 illustrating the second and third embodiments of the invention show that body 11', 11" may also comprise at least one recess 12 forming the pattern cavity of a decoration 13 intended to receive metallic material 16', 16". These configurations protect each deposition of metallic material 16', 16" in body 11', 11".

It is thus clear that, advantageously according to the invention, metallic material 16, 16', 16" may be deposited in any shape, such as, for example, a geometrical figure or an alphanumerical character.

Preferably, according to the invention, body 11, 11', 11" is formed of a metal oxide-based material which is not electrically conductive. Body 11 may thus be formed, for example, from a zirconium oxide and/or alumina and/or silica-based material.

Figure 4:
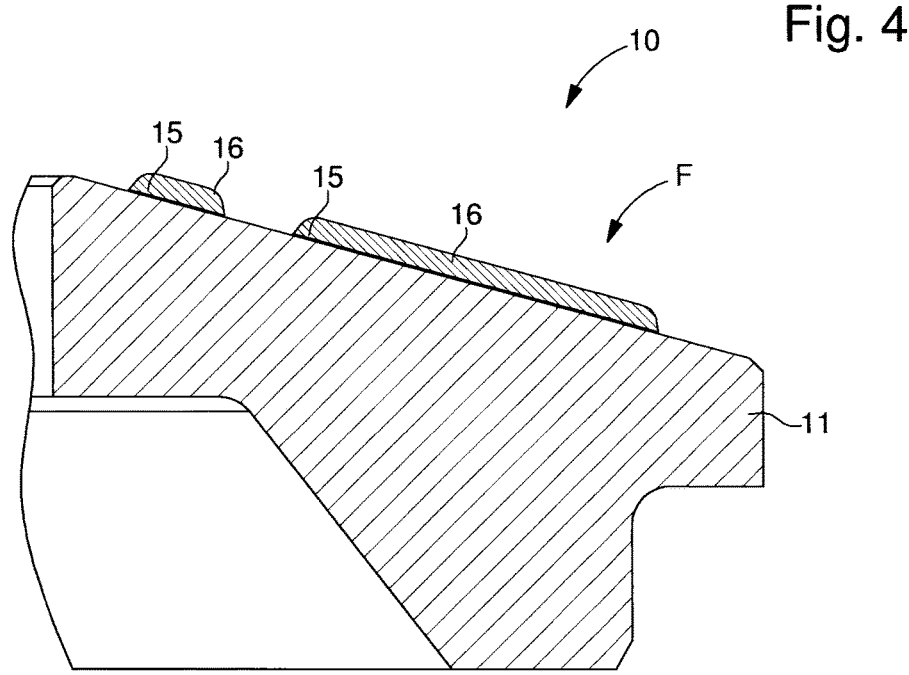
FIGS. 2 to 4 are successive steps of the manufacturing method according to a first embodiment of the invention.
Figure 2:
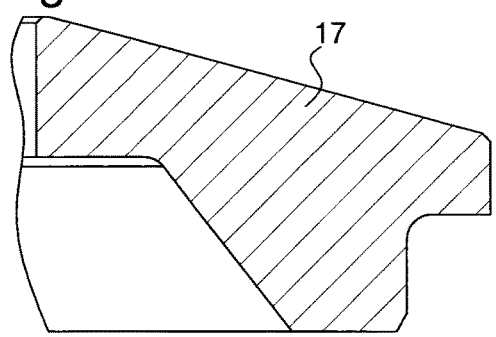
Figure 3:
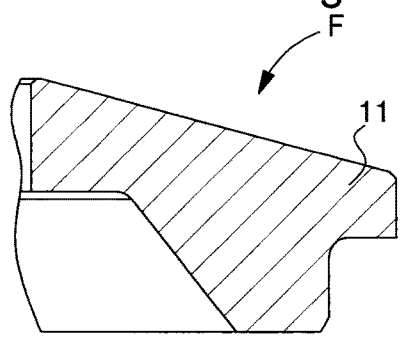
Figure 5:
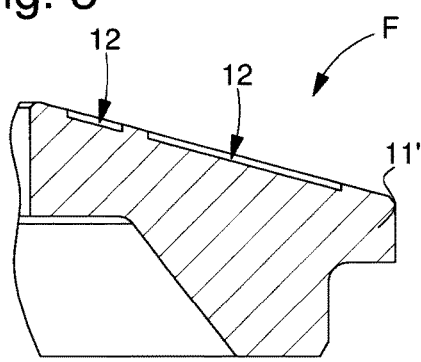
FIGS. 5 to 7 are successive steps of a manufacturing method according to a second embodiment of the invention.

In a first embodiment illustrated in FIG. 4, body 11 is made selectively conductive by removing oxygen atoms from one portion 15 of the external surface F thereof. This removal is performed to a predetermined depth in body 11 which may vary between 25 nm and 10 μm depending on the desired type of metallic material 16.

It is thus clear that the conductive surface is no longer obtained by depositing a layer on top of body 11, i.e. which could lead to delamination, but by the intrinsic destructuration of the material of body 11 to a predetermined depth, i.e. with no possibility of delamination.

Further, advantageously according to the invention, the oxygen atoms removal may be selective, namely the directivity of the reduction reaction allows it to be limited to all or part of the external surface F.

As illustrated in FIG. 4, element 10 according to the first embodiment thus includes an oxide-based ceramic body 11, selectively coated with a metallic material deposition 16 to form a functional part, such as a decoration 13 and/or a contact surface. Material 16 may a galvanic, sintered or cast type of material.

In a second embodiment illustrated in FIG. 7, inlaid ceramic element 10' includes a body 11' with at least one recess 12 forming the pattern cavity for a decoration 13. As in the first embodiment, body 11' is made selectively conductive by removing oxygen atoms from one portion 15' of external surface F. This removal is performed to a predetermined depth in body 11', which may vary between 25 mm and 10 μm depending on the desired type of metallic material 16'.

It is thus clear that the conductive surface is no longer obtained by depositing a layer on top of body 11', i.e. which could lead to delamination, but by the intrinsic destructuration of the material of body 11' to a predetermined depth, i.e. with no possibility of delamination.

Figure 6:
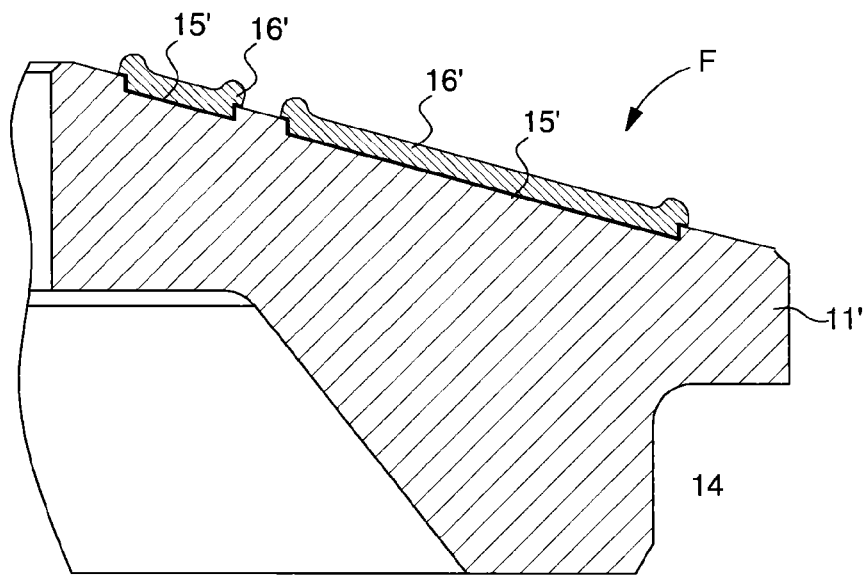

Further, advantageously according to the invention, the oxygen atoms removal may be selective, namely the directivity of the reduction reaction allows it to be limited to all or part of the external surface F. In the example of FIGS. 6 and 7, it is seen that the removal has been selectively performed at recesses 12.

As illustrated in FIG. 7, element 10' according to the second embodiment thus includes an oxide-based ceramic body 11' comprising recesses 12, which have been at least partially filled with a metallic material deposition 16' to form a functional part, such as a decoration 13 and/or a contact surface. Material 16' may a galvanic, sintered or cast type of material.

In order to improve the adherence of decoration 13 in body 11', recess 12 preferably has a depth of between 80 μm and 200 μm.

Moreover, for the purposes of adherence of the metallic deposition, preferably each recess 12 has a continuous, at least partially curved surface, i.e. the inner surface thereof does not include any edges.

In the third embodiment illustrated in FIG. 10, ceramic element 10" includes a body 11" including at least one recess 12 forming the pattern cavity for a decoration 13. Element 10" further includes an anchorage device for said at least one metallic decoration 13, communicating with said at least one recess 12 in order to improve the anchorage of said at least one decoration 13 against said element 10". The anchorage device preferably includes at least one hole 14 which passes through said element 10" and is at least partially filled by said deposition of metallic material 16".

As in the first and second embodiments, body 11" is made selectively conductive by removing oxygen atoms from one portion 15" of external surface F. This removal is performed to a predetermined depth in body 11", which may vary between 25 nm and 10 μm depending on the desired type of metallic material 16".

It is thus clear that the conductive surface is no longer obtained by depositing a layer on top of body 11", i.e. which could lead to delamination, but by the intrinsic destructuration of the material of body 11" to a predetermined depth, i.e. with no possibility of delamination.

Figure 9:
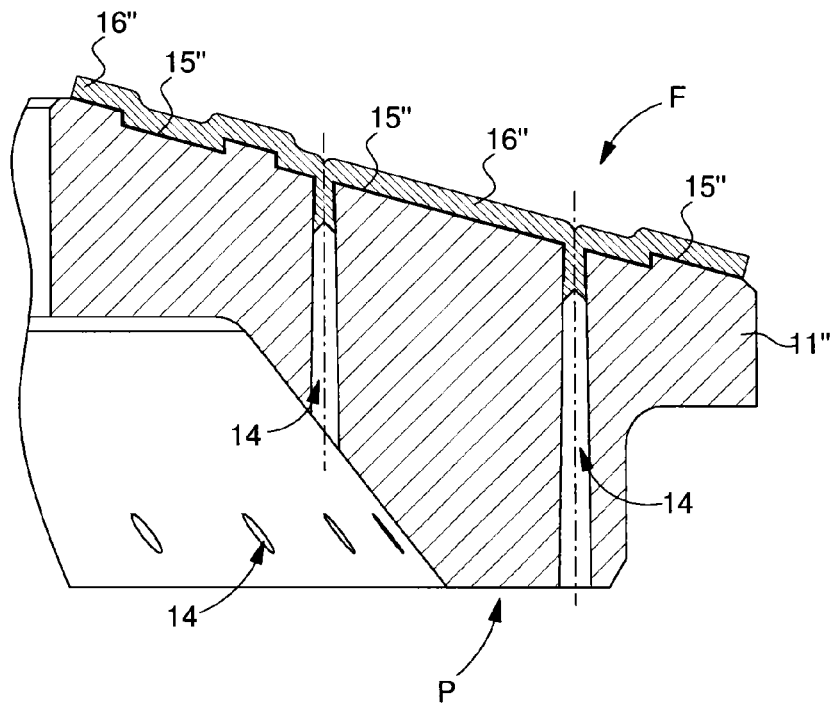

Further, advantageously according to the invention, the oxygen atoms removal may be selective, namely the directivity of the reduction reaction allows it to be limited to all or part of the external surface F. In the example of FIGS. 9 and 10, it is seen that the removal has been selectively performed over the entire surface F, i.e. including recesses 12 and holes 14.

As illustrated in FIG. 10, element 10" according to the third embodiment thus includes an oxide-based ceramic body 11", comprising recesses 12 which are entirely filled with a metallic material deposition 16" securely anchored by holes 14 to form a functional part, such as a decoration 13 and/or a contact surface. Material 16" may a galvanic, sintered or cast type of material.

In the example illustrated in FIG. 10, it is also seen that the diameter of hole 14 may flare gradually as it gets further away from said at least one recess 12 in order to hold metallic material 16" against element 10". Indeed, in the case where hole 14 is substantially conical, since the diameter of hole 14 opening into recess 12 is smaller than the rest of hole 14, decorations 13 can no longer be removed.

In order to improve the adherence of decoration 13 in body 11", recess 12 preferably has a depth of between 80 μm and 200 μm.

Moreover, for the purposes of adherence of the metallic deposition, preferably each recess 12 has a continuous, at least partially curved surface, i.e. the inner surface thereof does not include any edges.

Finally, as explained above, in the case where each hole 14 is substantially conical, since the diameter of hole 14 opening into recess 12 is smaller than the rest of hole 14, the decorations 13 can no longer be removed. Preferably, each hole 14 can thus have a diameter substantially equal to 100 μm at the bottom of recess 12 and finish with a diameter substantially equal to 120 μm or more on the surface P opposite body 11".

Regardless which embodiment of the invention is used, the visual rendering of each decoration 13 is mainly obtained via the colour of galvanic deposition 16, 16', 16". Consequently, the metallic material 16, 16', 16" used will preferably be guided by the colour, or more generally, the aesthetic appearance thereof. Therefore, metallic material 16, 16', 16" may include gold and/or copper and/or silver and/or indium and/or platinum and/or palladium and/or nickel.

By way of example, it is thus possible to obtain a complex visual rendering by giving body 11, 11', 11" a shiny appearance and a satin appearance to each metallic material 16, 16', 16". Further, each metallic material 16, 16', 16" may be formed of the same metal to offer a homogeneous appearance. However, it is also possible to envisage using several different metals for each metallic material 16, 16', 16", for example to give two decorations a different colour, such as one colour for the indices and another for the alphanumerical characters in the case of FIG. 1.

In order to make the colours uniform, it is also possible to envisage forming decorations 13 in the same material as that surrounding body 11, 11', 11". One could thus, in an embodiment example of FIG. 1, have decorations 13 of bezel 4 in the same material as case 2, bracelet 3, the rest of bezel 4, dial 5, push buttons 7 and/or crown 8.

Advantageously according to the invention, it is possible to use material 16, 16', 16" to secure a member to body 11, 11', 11". Indeed, in light of the above embodiments, a member formed, for example from the same type of material as body 11, 11', 11" or of a metallic material, may be locked against body 11, 11', 11" during the deposition of metallic material 16, 16', 16". This variant would offer more variety in the shapes and materials of decorations 13.

Finally, optionally, inlaid element 10, 10', 10" may, according to the invention, also provide an optional, substantially transparent layer, in order to protect each metallic material 16, 16', 16" and possibly each member from ageing. This layer may for example include silicon nitride notably to protect each metallic material 16,16',16", and if appropriate each member, from tarnishing, especially when said materials or member contain silver.

The method 21 of manufacturing a ceramic element 10, 10', 10" will now be explained with reference to FIGS. 2 to 11.

Figure 11:
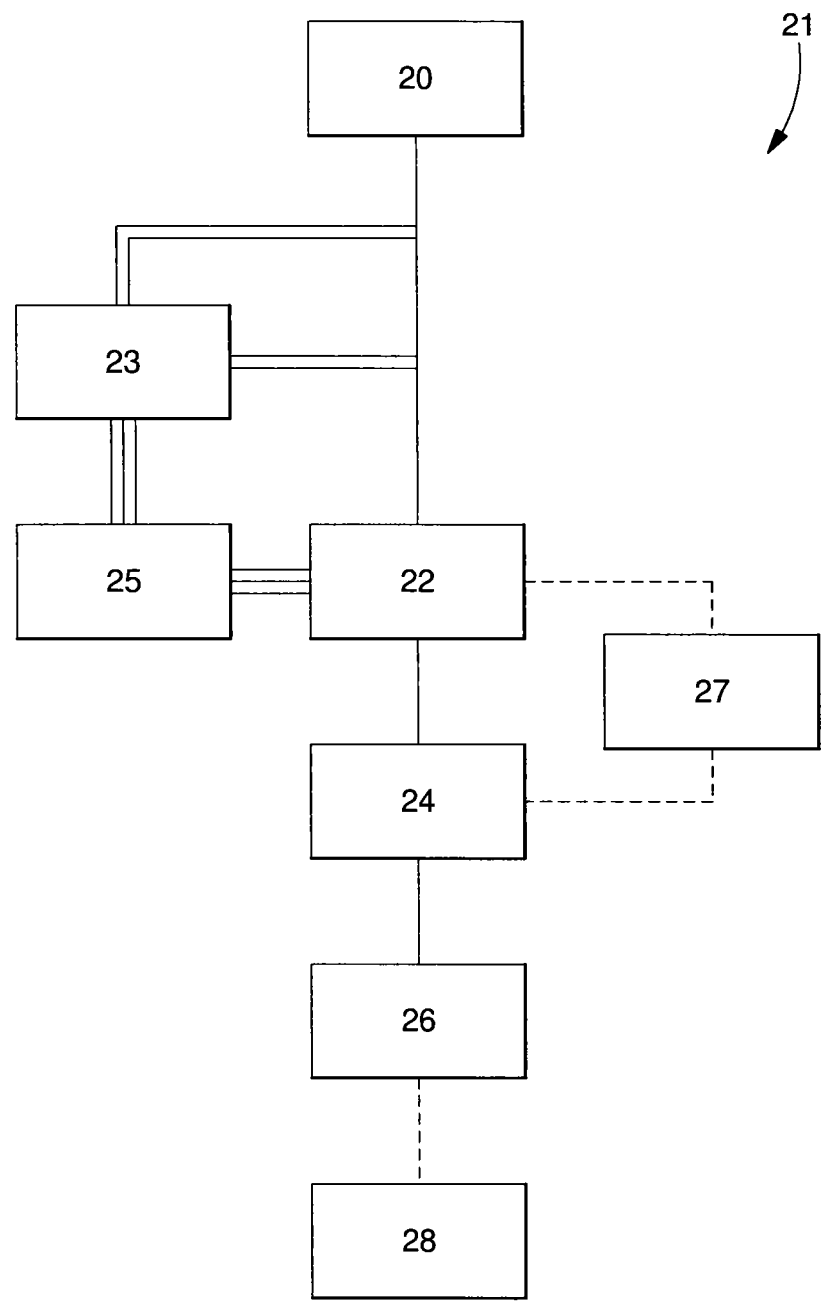
FIG. 11 is a flow diagram of the method according to the invention.

In the first embodiment illustrated in FIG. 11 in single lines, in a first step 20, method 21 consists in forming body 11, for example, of zirconium oxide. As is partially shown by the change from FIG. 2 to FIG. 3, the final body 11 of step 20 is preferably obtained by sintering, i.e. from a green body 17 preformed via an injection process. At the end of step 20, the body 11 visible in FIG. 3 has its final dimensions.

As illustrated in FIG. 11, method 21 includes a second step 22 for exposing at least one portion 15 of external surface F of body 11 to a reduction reaction, to remove oxygen atoms to a predetermined depth in order to make said at least one portion 15 electrically conductive.

According to the invention, step 22 is preferably performed by plasma etching. However, any alternative means of removing oxygen atoms may be used.

Preferably, the plasma used in step 22 includes an ionised mixture of hydrogen and neutral gas which etches all or part of body 11.

Advantageously according to the invention, the predetermined depth of oxygen atoms removal is comprised between 25 nm and 10 μm according to the metallic material 16 used. It is thus clear that, in step 22, it is possible to choose to expose the entire external surface F of body 11 to a reduction reaction.

As illustrated in FIG. 11, method 21 according to the first embodiment comprises a third step 24 for depositing a metallic material 16 starting from conductive portions 15 of face F of body 11 to coat all or part of face F as seen in FIG. 4. Step 24 may, for example, be achieved by electroplating, sintering or casting.

As explained above, depending upon the colour or more generally the desired visual rendering, the metallic material 16 deposited in step 24 includes gold and/or copper and/or silver and/or indium and/or platinum and/or palladium and/or nickel.

Finally, in a fourth step 26, method 21 ends by machining body 11 and/or metallic material 16 to aesthetically finish element 10. The coated element 10 is thus finished and simply requires assembly in a final part. This step 26 can be obtained by a usual surfacing method such as grinding or lapping to remove any surplus material, followed by polishing.

As explained above, the method may also include, before step 24, the respective steps of forming a member then assembling the member to body 11. It is thus clear that step 24 secures the assembly of the member to the body 11 by locking the member against said body via said metallic material. Thus, the body and/or member may comprise at least one flat or non flat geometry intended to be coated by metallic material 16 so as to secure the assembly.

By way of example, the member may be formed from the same type of material as body 11, namely a ceramic obtained in step 20 or a ceramic made conductive in steps 20 and 22, or even from a metallic material.

Finally, method 21 according to the invention may also have an optional final step 28 for depositing a substantially transparent layer so as to protect each metallic material 16, and if appropriate each member, from ageing. This layer may, for example, include silicon nitride to prevent metallic material 16, and if appropriate each member, from tarnishing, especially when they are mainly formed from a silver-based material.

According to a second embodiment illustrated in double lines in FIG. 11, first step 20 is identical to the first embodiment. As illustrated in FIG. 11, method 21 according to the second embodiment includes a second step 23, for etching at least one blind recess 12 in a surface F of ceramic body 11', with recesses 12 forming the pattern cavity for subsequent decorations 13 as visible in FIG. 5.

Preferably, each recess 12 has a depth of between 80 μm and 200 μm. Moreover, preferably, each recess 12 has a continuous, at least partially curved surface in order to facilitate implementation of deposition step 24 explained below. Step 23 is preferably obtained by destructive radiation using a laser in order to obtain highly precise etches.

As illustrated in FIG. 11, method 21 according to the second embodiment includes a third step 22 for exposing at least one portion 15' of external surface F of body 11' to a reduction reaction in order to remove oxygen atoms to a predetermined depth in order to make said at least one portion 15' electrically conductive with the same features, the same technical effects and the same advantages as in the first embodiment.

It is thus clear that, in step 22, it is possible to choose to expose all or part of external surface F of body 11' to a reduction reaction. In the example illustrated in FIGS. 6 and 7, it is seen that removal of oxygen atoms has been selectively performed in recesses 12.

As illustrated in FIG. 11, method 21 according to the second embodiment comprises a fourth step 24 for depositing a metallic material 16' starting from conductive portions 15' of surface F of body 11' to coat all or part of face F as seen in FIG. 6, with the same features, the same technical effects and the same advantages as in the first embodiment. Step 24 may, for example, be achieved by electroplating, sintering or casting.

It is noted, advantageously according to the invention, that material 16' may thus not completely fill each recess 12, i.e. certain recesses 12 may not be filled or certain recesses may only be filled to a smaller depth and/or section compared to those of the recess 12 associated therewith. It is thus clear that is possible to obtain a saving of metallic material 16 and to save time in step 26 (less material to machine).

Finally, in a fifth step 26 illustrated in FIG. 7, method 21 ends by machining body 11' and/or metallic material 16' in order to provide element 10' with an aesthetic finish. Coated and/or inlaid element 10' is thus finished and simply requires assembly in a final part. This step 26 may be obtained with the same features, the same technical effects and the same advantages as in the first embodiment.

As explained above, the method according to the second embodiment may also comprise, before step 24, the respective steps of forming a member and then assembling the member to body 11'. It is thus clear that step 24 secures the assembly of the member to the body 11' by locking the member against said body via said metallic material. Thus, the body and/or member may comprise at least one flat or non flat geometry intended to be coated by metallic material 16' so as to secure the assembly.

By way of example, the member may be formed from the same type of material as body 11', namely a ceramic obtained in step 20 or a ceramic made conductive in steps 20 and 22, or even from a metallic material.

Finally, step 21 according to the second embodiment may also provide a last, optional step 28 for depositing a substantially transparent layer in order to protect each metallic material 16' from ageing, with the same features, the same technical effects and the same advantages as in the first embodiment.

According to the third embodiment illustrated in triple lines in FIG. 11, the first step 20 is identical to the first embodiment. As illustrated in FIG. 11, method 21 according to the third embodiment includes a second step 23, for etching at least one blind recess 12 in one surface F of ceramic body 11', with recesses 12 forming the pattern cavity for future decorations 13 as visible in FIG. 8 with the same features, the same technical effects and the same advantages as in the second embodiment.

Figure 8:
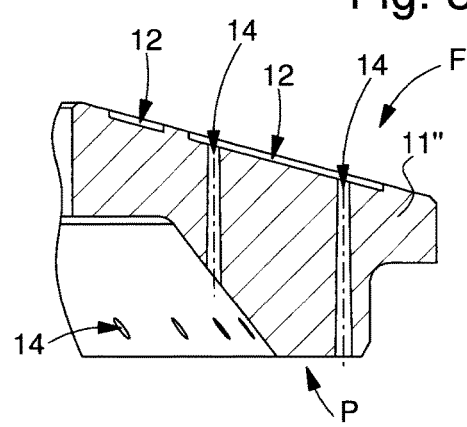
FIGS. 8 to 10 are successive steps of the manufacturing method according to a third embodiment of the invention.

As illustrated in FIG. 11, method 21 according to the third embodiment continues with a third step 25 for etching at least one hole 14 communicating with each recess 12 so as to form a securing device. As seen in FIG. 8, depending upon the shape and span of each recess 12, one or several holes 14 are made for each recess 12. Step 25 is preferably obtained by destructive radiation using a laser in order to obtain highly precise etches.

According to the invention, each hole 14 passes through body 11" of element 10" so that it may be at least partially filled in step 24 by the metallic material 16" to increase the surface contact with said element.

Indeed, it is clear in particular that the material may thus flow "in front of" and "behind" recess 12, namely it may be deposited in each recess 12 and in each hole 14 at any time in step 24.

Finally, as seen in FIG. 8, the diameter of each hole 14 flares gradually as it gets further away from said at least one recess 12, in order to lock the future metallic material 16" against element 10". Indeed, as explained above, in the case where each hole 14 is substantially conical, since the diameter of hole 14 opening into recess 12 is smaller than the rest of hole 14, each metallic material 16" can no longer be removed. Preferably, each hole 14 can thus have a diameter substantially equal to 100 μm at the bottom of recess 12 and finish with a diameter substantially equal to 120 μm or more on the surface P opposite body 11".

Preferably, advantageously according to the invention, step 25 is achieved by orienting the laser beam from the opposite surface P so as to form said at least one hole 14 immediately in a conical manner, i.e. in which the largest diameter is at the join with the opposite surface P.

As illustrated in FIG. 11, method 21 according to the third embodiment includes a fourth step 22, for exposing at least one portion 15" of external surface F of body 11" to a reduction reaction so as to remove oxygen atoms to a predetermined depth in order to make said at least one portion 15" electrically conductive, with the same features, the same technical effects and the same advantages as in the first and second embodiments.

It is thus clear that, in step 22, it is possible to choose to expose all or part of external surface F of body 11" to a reduction reaction. In the example illustrated in FIGS. 9 and 10, it is seen that oxygen atoms removal has been selectively performed over the entire surface F, i.e. including in recesses 12 and holes 14.

As illustrated in FIG. 11, method 21 according to the third embodiment includes a fifth step 24, for depositing a metallic material 16" from conductive portions 15" of surface F of body 11" to coat all or part of surface F as seen in FIG. 9, with the same features, the same technical effects and the same advantages as in the second embodiment. Step 24 may, for example, be achieved by electroplating, sintering or casting.

In order to facilitate these filling operations, material is preferably forcibly renewed in recesses 12 and holes 14 via agitation or vibration, to prevent any problems in filling recesses 12 and holes 14.

It is noted, advantageously according to the invention, that material 16" may thus not completely fill each recess 12 and/or each hole 14, i.e. certain recesses 12 which do not have holes 14 may not be filled or certain recesses 12 and/or holes 14 may only be filled to a smaller depth and/or section compared to those of the recess 12 and/or hole 14 associated therewith. It is thus clear that is possible to obtain a saving of metallic material 16" and to save time in step 26 (less material to machine).

Finally, in a sixth step 26 illustrated in FIG. 10, method 21 ends by machining body 11" and/or metallic material 16", to give element 10" an aesthetic finish. Coated and/or inlaid element 10" is thus finished and simply requires assembly on a final part. This step 26 may be obtained with the same features, the same technical effects and the same advantages as in the first and second embodiments.

As explained above, the method according to the third embodiment may also comprise, before step 24, the respective steps of forming a member and then assembling the member to body 11". It is thus clear that step 24 secures the assembly of the member to the body 11" by locking the member against said body via said metallic material. Thus, the body and/or member may comprise at least one flat or non flat geometry intended to be coated by metallic material 16" so as to secure the assembly.

By way of example, the member may be formed from the same type of material as body 11", namely a ceramic obtained in step 20 or a ceramic made conductive in steps 20 and 22, or even from a metallic material.

Finally, step 21 according to the third embodiment may also provide a last, optional step 28 for depositing a substantially transparent layer in order to protect each metallic material 16" from ageing, with the same features, the same technical effects and the same advantages as in the first and second embodiments.

Of course, this invention is not limited to the illustrated example but is capable of various variants and alterations that will appear to those skilled in the art. In particular, depending on the adherence capacity of the galvanic deposition, a step 27 of depositing an optional wetting layer for the galvanic deposition may be provided between step 22 and step 24 as illustrated in FIG. 11.

Thus, a layer, for example of substantially 50 nm, may be deposited between each metallic material 16, 16', 16" and body 11, 11', 11". Depending on the method of depositing the wetting layer, several types of materials may be envisaged, for example, gold and/or copper and/or silver and/or indium and/or platinum and/or palladium and/or nickel.

Moreover, the forming of recesses 12 in step 23 could also be switched with the forming of holes 14 in step 25 without losing the advantages of the invention. It is also possible to envisage substituting laser etching in step 23 and/or step 25 with another type of etching if the precision and reject rate thereof are acceptable.

Finally the application of element 10, 10', 10" according to the invention is not limited to a timepiece 1. Thus, element 10, 10', 10" could, by way of example, be applied to a piece of jewelry or even to tableware.

What is claimed is:

1. A method of manufacturing a ceramic element for a timepiece, comprising the following steps:
    a) forming an oxide-based ceramic body;
    b) exposing at least one portion of an external surface of the body to a reduction reaction to remove oxygen atoms to a predetermined depth and to make the at least one portion of the external surface of the body electrically conductive;
    c) depositing a metallic material starting from the at least one electrically conductive portion of the external surface of the body to coat all or part of the exposed at least one portion of the external surface; and
    d) machining the body and/or the deposited metallic material to provide the element with an aesthetic finish.

2. The method according to claim 1, wherein, between step a) and step b), the method includes the following step:

e) etching at least one recess in one surface of the body, the at least one recess forming a pattern cavity for a decoration, and
    wherein the step c) completely fills the at least one recess.

3. The method according to claim 2, wherein after step e), the method includes the following step:
    f) etching at least one hole communicating with the at least one recess in order to form an anchorage device, and
    wherein the step c) completely fills the at least one recess and at least partially fills the at least one hole.

4. The method according to claim 3, wherein the at least one hole traverses the element and is at least partially filled in step c) by the deposited metallic material so as to increase a contact surface with the element.

5. The method according to claim 4, wherein a diameter of the at least one hole flares gradually as the hole moves further away from the at least one recess in order to hold the deposited metallic material against the element.

6. The method according to claim 3, wherein step f) is achieved by laser by orienting a beam from a surface opposite a surface intended to receive the at least one recess.

7. The method according to claim 2, wherein step d) is achieved by laser.

8. The method according to claim 2, wherein step e) is performed to a depth of between 80 µm and 200 µm in order to improve a force of adherence between the deposited metallic material and the body.

9. The method according to claim 2, wherein the at least one recess includes a continuous or at least partially curved surface in order to facilitate the implementation of step c).

10. The method according to claim 1, wherein after step c), the method includes the following steps:
    g) forming a member; and
    h) assembling the member to the body, and
    wherein the step c) secures the assembly of the member to the body by locking the member against the body via the deposited metallic material.

11. The method according to claim 10, wherein the member is formed from the same type of material as the body.

12. The method according to claim 10, wherein the member is formed from a metallic material that is the same as that of the deposited metallic material or is different from that of the deposited metallic material.

13. The method according to claim 1, wherein step b) is achieved by plasma etching.

14. The method according to claim 13, wherein the plasma used in step b) includes an ionised mixture of hydrogen and neutral gas.

15. The method according to claim 1, wherein step a) is achieved by sintering.

16. The method according to claim 1, wherein the predetermined depth of oxygen atoms removal is comprised between 25 nm and 10 µm.

17. The method according to claim 1, wherein in step b), the entire external surface of the body is exposed to the reduction reaction.

18. The method according to claim 1, wherein step c) is achieved by electroplating, sintering, or casting.

19. The method according to claim 1, wherein the body is formed from a metal oxide.

* * * * *